Patented Dec. 28, 1937

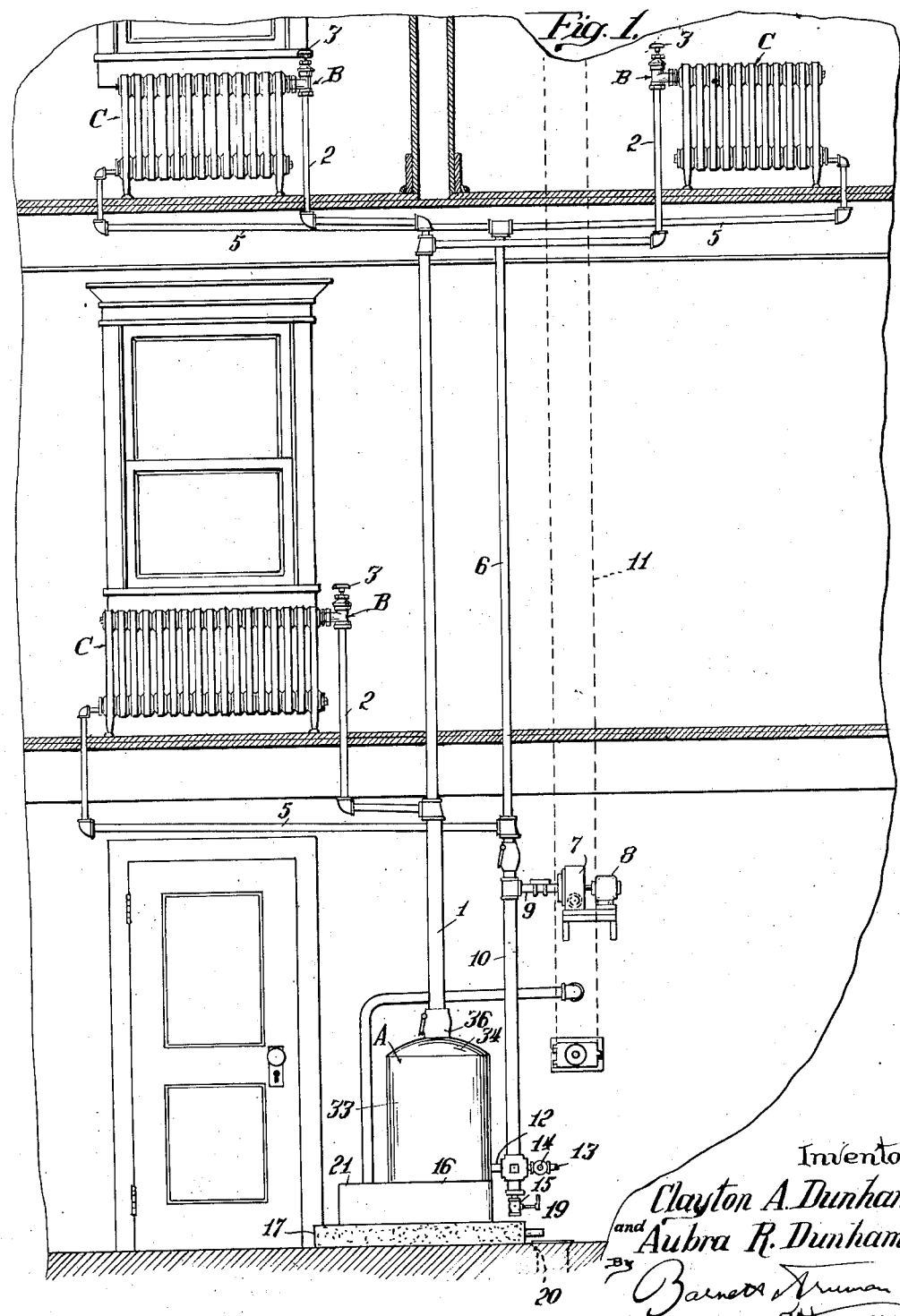

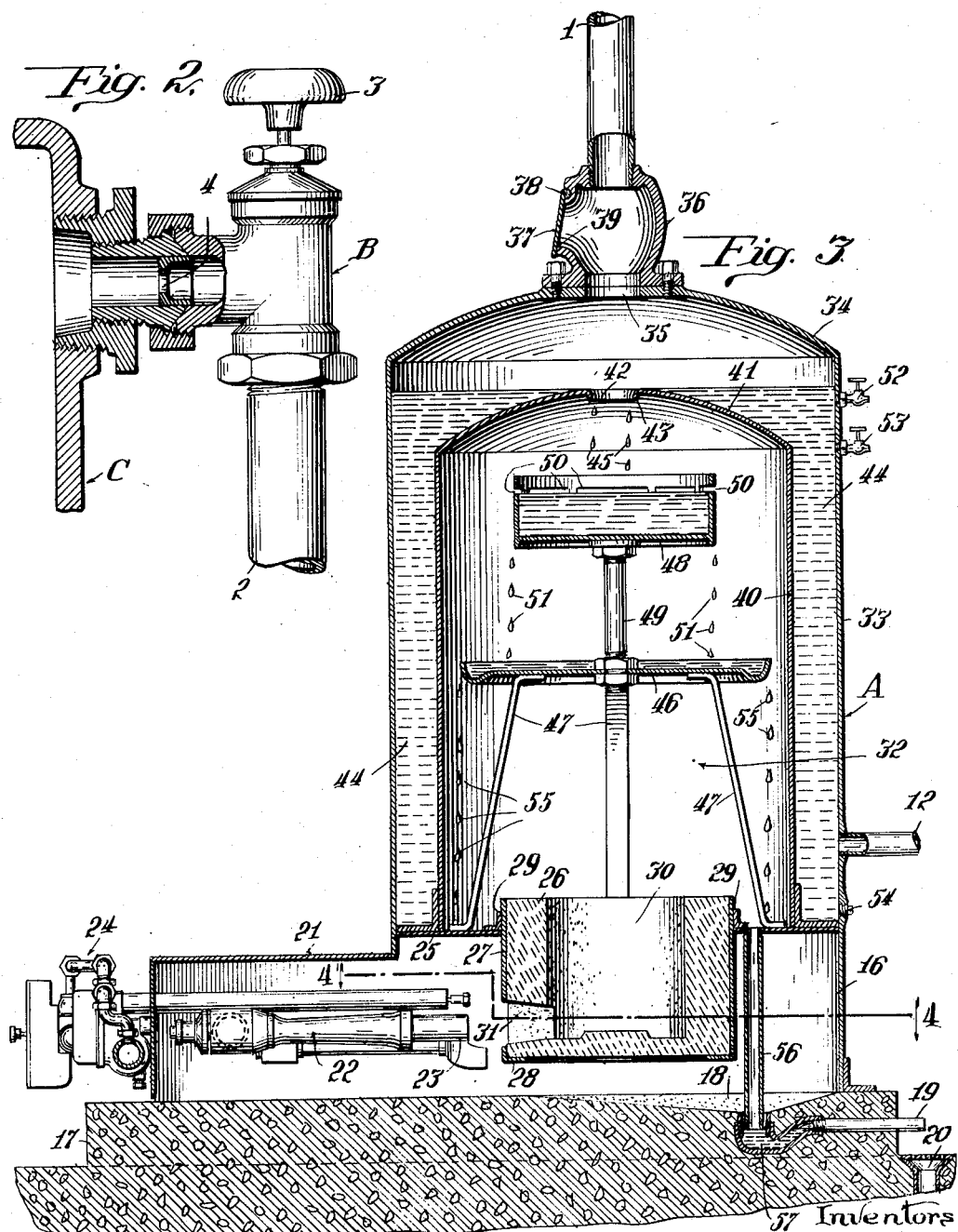

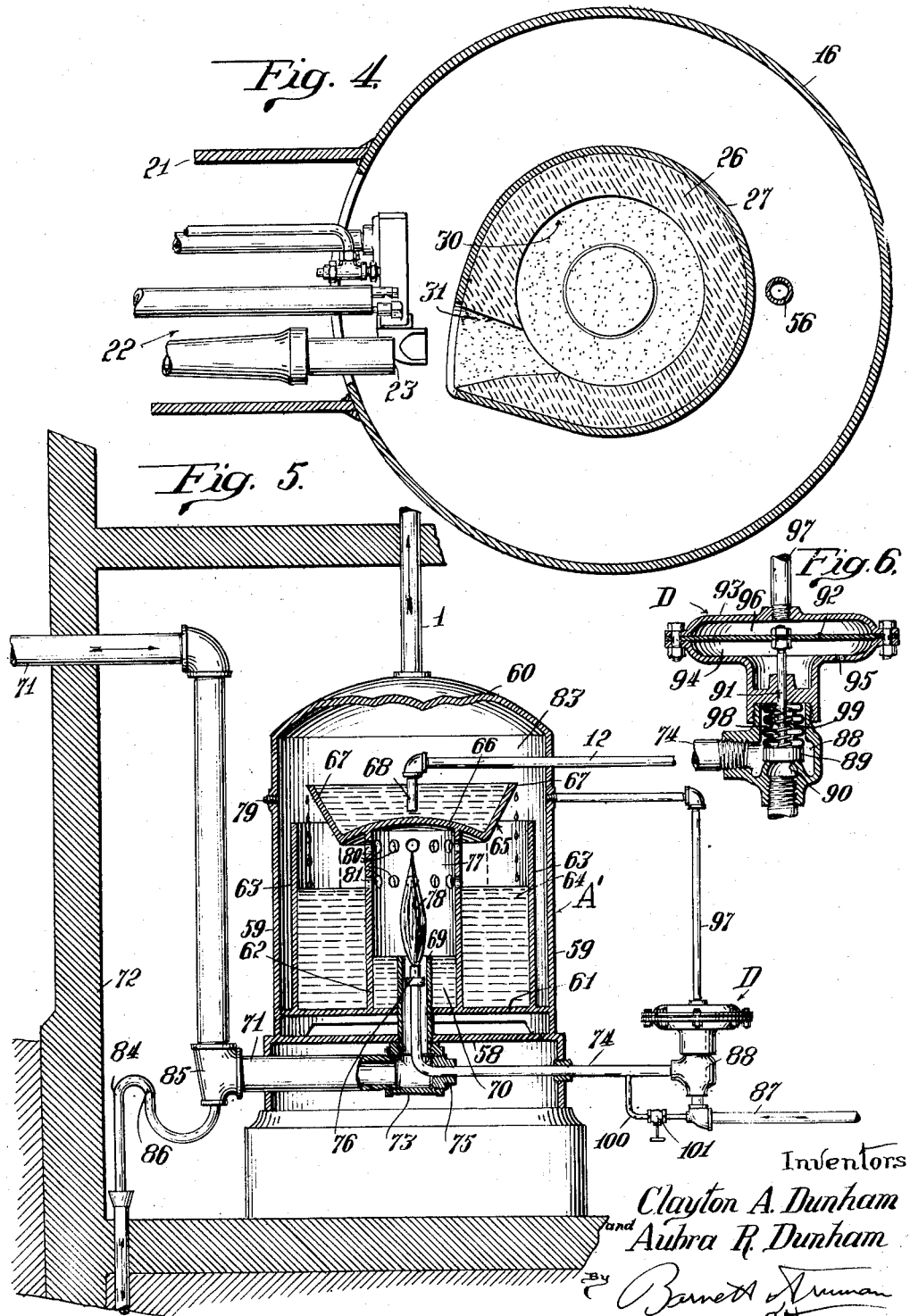

2,103,770

UNITED STATES PATENT OFFICE 2,103,770

METHOD AND APPARATUS FOR GENERATING HEATING MEDIUM

Clayton A. Dunham and Aubra R. Dunham, Glencoe, Ill., assignors to Experimental Laboratories Incorporated, Chicago, Ill., a corporation of Illinois Application December 31, 1934, Serial No. 759,966
In Canada June 4, 1930

8 Claims. (Cl. 237—1)

This invention relates to a new and improved process and apparatus for generating a heating medium consisting of mixed steam and products of combustion for use in a heating system.

In the type of heating system to which this invention relates, fuel is burned in proximity to an enclosed body of water and the products of combustion are passed in intimate contact with the water so as to form steam, and the heating medium consisting of the mixed steam and products of combustion is delivered into radiators wherein the steam is condensed and also a large portion of the heat from the products of combustion is utilized for heating purposes. The cooled non-condensable gases are withdrawn from the radiators, thus causing the continuous circulation of the heating medium, and the condensate from the steam is returned to the generator to be reconverted into steam.

Improved heating systems of this type are disclosed and claimed in our co-pending applications Serial Nos. 376,537, filed July 8, 1929; 466,002, filed July 7, 1930, and 558,293, filed August 20, 1931. The present invention relates to the improved generator and process of generating the heating medium, said subject matter having been divided out of said three co-pending applications, of which applications this present application forms a continuation in part. The form of generating apparatus shown in Figs. 5 and 6 was first disclosed in our application Serial No. 376,537. The apparatus shown in Figs. 3 and 4 was first disclosed in our application Serial No. 558,293. A form of generator utilizing most of the features shown in Figs. 3 and 4 was first disclosed in application Serial No. 466,002.

Briefly described, this generating apparatus comprises a closed housing in which is confined a combustion chamber wherein the fuel is burned. The housing encloses a combustion space and mixing chamber which is substantially surrounded by a body of water, and another body or bodies of water are supported within the space in the path of the combustion gases so as to be heated thereby. The bodies of water are in open surface contact with the combustion gases so that the steam formed will mix with these gases, and as the water expands when heated and is added to by condensate returned from the heating system it will overflow from one container to another so as to provide an extended surface contact with the combustion gases and increase the generation of steam. The heating medium is drawn out through an outlet in the upper portion of the housing, and the body of water positioned at the greatest elevation is replenished by condensate returned from the heating system so that the process is continuous.

The principal object of this invention is to provide an improved process and apparatus for generating mixed fluid heating medium, such as briefly described hereinabove and disclosed more in detail in the specifications which follow.

Other objects and advantages of this invention will be more apparent from the following detail description of certain approved forms of apparatus constructed and operating according to the principles of this invention.

In the accompanying drawings:

Fig. 1 is an elevation showing the principal elements of a heating system in which a generator of this type is used.

Fig. 2 is an elevation, partially in section, of one of the radiator inlet valves.

Fig. 3 is a vertical central section through a preferred type of generator.

Fig. 4 is a horizontal section taken substantially on the line 4—4 of Fig. 3.

Fig. 5 is a vertical section through another form of generator.

Fig. 6 is a vertical section through the automatic fuel-control valve shown in Fig. 5.

Referring first to the general heating system as indicated in Figs. 1 and 2, the improved generator A discharges heating medium through the main supply pipe 1 and through the branch pipes 2 connected through inlet valves B with the several radiators C. Each of these inlet valves B includes a cut-off valve of usual type operated by the hand-wheel 3 and includes an orifice plate 4 through which the heating medium is admitted to the radiator. The orifices 4 may be made of different sizes, in accordance with the capacity of the individual radiator and its position in the heating system, so that the heating medium will be properly distributed amongst the several radiators. Branch return pipes 5 lead from the several radiators into the main return pipe 6. The exhauster 7 operated by motor 8 is connected through branch pipe 9 with the lower portion 10 of return main 6, this exhauster withdrawing cooled non-condensable gases from the radiators and discharging these gases into the flue 11. The withdrawal of these gases, together with the condensation of steam in the several radiators, causes a partial vacuum extending back to the generator A so as to withdraw the heating medium therefrom and keep up the circulation through the heating system. The condensate formed in the radiators and piping drains out by gravity through the return pipes 5, 6 and 10, and thence through pipe 12 back into the generator A. Additional water can be supplied whenever necessary, as when starting the system, through pipe 13 provided with valve 14. A scale-collecting pocket and drain connection 15 may be provided at the lower end of return pipe 10. Heating systems of this type, provided with manual and automatic controls for the burners and the exhausting mechanism, not here shown, are disclosed more in detail and claimed in our three co-pending applications hereinabove referred to.

The form of generating apparatus shown in Figs. 3 and 4 will now be described. An essential characteristic of this generator is that it is entirely closed except for the inlets for water, fuel and combustion air, and the outlets for the heating medium and excess water. None of these, except the inlet for combustion air, has any direct connection with the atmosphere within the building so that a reduced pressure may be maintained within the generator and the escape of fluid therefrom is prevented. The generator may be made of metal or suitable refractory materials, or both, preferably comprising an outer metallic shell covered with suitable insulating material (not here shown) in order to minimize heat losses. A lower substantially closed metallic housing 16 rests upon and is sealed to a concrete supporting base 17 formed with the sump 18 from which leads drain pipe 19 which may empty into the sewer connection indicated at 20. A side extension 21 of the lower casing 16 houses the burner assembly 22 which includes the main burner 23 for projecting the combustion materials into the combustion chamber. The burners are controlled by the assembly indicated at 24 which may be of the type disclosed and claimed in our copending application Serial No. 558,293. Combustion air is admitted to the casing 21 through any suitable opening.

Suitably mounted in and supported by the metallic cover plate 25 of lower casing 16 is the main lower combustion chamber 26 formed of suitable refractory material. The refractory shell 26 may be supported in a metallic casing 27 formed with a lower inwardly extending supporting flange 28 and supported from cover plate 25 by the angle brackets 29. The central cylindrical combustion chamber 30 is open at its upper end and provided adjacent its lower end with a tangential inlet opening 31 through which the fuel and air from main burner 23, and the combustion air, enter the combustion chamber 30. Due to this tangential opening, the combustion fluids and flame take a spiral or spinning path through the combustion chamber 30 whereby a very long flame and complete combustion may be attained almost entirely within the relatively small combustion chamber before the hot products of combustion pass upwardly into the mixing chamber 32.

The outer substantially cylindrical metallic shell 33 of the steam generator and mixing chamber is supported by the cover plate 25 or forms an upward extension of lower casing 16. The dome or cover 34 on casing 33 leads up to a central outlet opening 35 which communicates with the release valve casing 36 from the upper portion of which leads the main supply pipe 1 through which the heating medium is conducted to the radiating system. The release valve casing 36 is formed so that water will drip downwardly through opening 35, and is provided with the flap or closure 37 hinged to the casing at 38 and held by gravity against the inclined seat 39. The flap valve will also be held to its seat by the outer atmospheric pressure when the system is normally operated under a partial vacuum. If, for any reason, high pressures should be developed in the system, this flap valve will blow open and relieve pressure. The flap may also be raised at any time for observation purposes.

The inner metallic shell 40 is formed at its top with a dome 41 provided with a central opening 42 through the downwardly extending cylindrical overflow flange 43. This central opening 42 is also in vertical alignment with the outlet conduit 1 and serves as an outlet for the heating medium from the mixing chamber 32. The annular space 44 between inner and outer shells 40 and 33 is normally filled with water up to the level of overflow opening 42, through which excess water flows downwardly into chamber 32 as indicated by the drops 45. A shallow flash plate or pan 46 is supported by legs 47 from cover plate 25, the flash plate 46 being positioned substantially centrally within the mixing chamber 32. A water heating pan or container 48 is supported beneath overflow opening 42 by the central post 49 extending upwardly from flash plate 46. The upwardly extending side walls of pan 48 are provided near their upper edges with a circumferentially extending series of restricted outlet openings or slots 50. The water falling at 45 through outlet opening 42 will accumulate in heating pan 48 up to the level of outlet openings 50 through which the heated water (that is the water that has not already been vaporized) will overflow as indicated at 51 onto the flash pan 46. The purpose of the overflow openings 50 is to secure a better distribution of the overflow water in case heating pan 48 is not exactly level.

The water supply pipe 12 (already described) communicates with the annular water space 44 so as to return condensate into this container. The pet-cocks 52 and 53 are provided to check the upper water level, and drain plug 54 is provided so that the container 44 may be drained and flushed out. As additional water slowly accumulates in space 44 due to the return of condensate from the heating system, the water will overflow through opening 42 into heating pan 48 and thence overflow again onto flash pan 46 as already described.

In operation, the highly heated products of combustion rising from combustion chamber 30 pass under and around the flash plate 46 so as to convert all or the greater portion of the film of water thereon into steam. The products of combustion also contact with the water falling through or from overflow opening 42, as indicated at 45, and from heating pan 48 as indicated at 51, whereby additional steam is generated. The rising products of combustion will highly heat the water in pan 48 so that some steam will be generated from this body of water, and so that the water which drops onto the flash pan 46 will already be raised to a high temperature. The hot gases rising through mixing chamber 32 will heat the annular body of water in container 44 so that additional steam is generated from this water, all of the mixed gases consisting of steam and products of combustion passing out through the main supply pipe 1 to the heating system. It will be noted that the mixing chamber 32 is entirely closed at its lower end except for the inlet opening for the flame and combustion air at 31 through combustion chamber 30, and the only outlet being through the supply main 1 through which the heating medium passes out. The entire generator will preferably be protected by an outer covering of insulating material (not here shown) so that the heat losses will be minimized and practically all of the heat generated is carried out through the radiating system by the heating medium discharged through pipe 1.

Since practically all of the condensate from the radiating system is returned to the generator through pipe 12, and since additional water is always being formed in the combustion process from the hydrogen in the gas and the oxygen in the air, there will ordinarily be a surplus of water supplied to the generator. Any excess of water that is not vaporized on flash pan 46 will overflow, as indicated at 55, and then drain out through pipe 56 provided at its lower end with water-seal 57, thence flowing through drain pipe 19 to the sewer connection at 20.

In the modified form of generator shown in Figs. 5 and 6, the outer casing comprises a bottom wall 58, vertical cylindrical side walls 59 and a dome shaped roof or cover 60 from which leads the supply pipe 1 for conducting the heating medium to the radiating system. The main inner container consisting of bottom wall 61 and inner and outer cylindrical walls 62 and 63 forms an annular container or basin for the main body of water indicated at 64. A pan 65 open at its upper side and comprising an upwardly dished bottom wall 66 and downwardly converging side walls 67 is supported on the top of the inner cylindrical wall 62. The pipe 12 for returning condensate and supply water extends inwardly through the outer casing 59 and has a downwardly projecting discharge leg 68 extending beneath the water level in pan 65 so as to form a water seal.

The air inlet tube 69 projects upwardly through the bottom walls 58 and 61 and extends centrally upward within the lower portion of the inner annular wall 62 so as to form a third water container or reservoir 70 of annular form. The air inlet pipe 71 leads in through one wall 72 of the building from the outer atmosphere and connects through fitting 73 with the lower end of the air inlet tube 69. The supply pipe 74 for gas or other fuel extends inwardly through a closure plug 75 in one end of fitting 73 and terminates in a burner nozzle 76 of suitable form near the upper end of air supply tube 69. The space 77 within the upper portion of cylinder 62 constitutes a main combustion chamber, the flame being indicated at 78. Any suitable means may be utilized to ignite the fuel. An opening closed by removable plug 79 may be provided in the outer casing 59, through which opening a lighted taper or an electric sparking device can be inserted to initially ignite the gas after which plug 79 is replaced to seal the opening. A plurality of circular series of openings 80 and 81 are formed in the cylindrical wall 62 to permit the products of combustion to pass from chamber 77 into the main chamber 83 within the outer casing. The lower openings 81 also determine the water level in the outer reservoir 64. A water discharge pipe 84 leads from a fitting 85 in the air inlet pipe 71, pipe 84 being looped upwardly at 86 to provide a water seal against the entrance or escape of gases through this pipe.

The gas supply pipe 87 leads from the outside source of gas supply to the valve chamber 88 of the automatic control valve indicated generally at D, the supply pipe 74 leading from this valve chamber to the burner 76. One suitable form of control valve is indicated diagrammatically in Fig. 6. A valve plate 89 is adapted to engage with the valve seat 90 to cut off the flow of gas or other fuel through the valve. Valve stem 91 leads upwardly from valve plate 89 to a flexible diaphragm 92 housed in a diaphragm casing 93. The chamber 94 beneath the diaphragm 92 is open to atmospheric pressure through aperture 95. The chamber 96 above diaphragm 92 is connected through pipe 97 with the interior of generator A', whereby diaphragm chamber 96 will always be under substantially the pressure existing in the generator. A sealing diaphragm 98 of the flexible bellows type is connected between the valve casing 88 and the valve plate 89 to prevent the escape of gas around valve stem 91.

When the chambers 94 and 96 at the two sides of diaphragm 92 are both under atmospheric pressure and diaphragm 92 is in its normal central position, the valve plate 89 will be held against valve seat 90 to close the valve. If desired an auxiliary spring 99 may be employed for holding the valve against its seat. When the pressure within the generator A is lowered below atmospheric pressure, the pressure in chamber 96 above diaphragm 92 will be correspondingly lowered and the atmospheric pressure within chamber 94 beneath the diaphragm will lift the valve so as to permit gas to flow from pipe 87 to pipe 74 and thence to burner 76. The greater the vacuum within the generator, the lower the pressure above diaphragm 92 and consequently the greater pressure differential will be exerted on this diaphragm to open the valve so that the supply of gas admitted to burner 76 will be increased proportionately as the pressure is lowered within the generator. A very small pipe 100, provided with a normally open stop cock 101, is shunted around valve D to connect gas supply pipe 87 with gas pipe 74 so that a small flow of gas to the burner 76 will always be permitted, whereby a small pilot flame, insufficient for normal heating purposes, is maintained even though valve D is closed.

In operation, water flows into the generator A' through pipe 12 and is discharged through outlet 68 into the pan 65. When this pan is completely filled it overflows in the form of drops falling from the upper edge of the pan into the annular basin or reservoir 64, and in the form of a thin film flowing down the inclined walls 67 of the pan. Any excess of water in reservoir 64 flows through openings 81 and down the inner surface of inner annular wall 62 into the reservoir 70. Any excess of water in reservoir 70 flows down through air tube 69 and out through pipe 71 and the discharge pipe 84 to the sewer.

Assuming that a partial vacuum exists within the generator, valve D will be opened to admit fuel gas to the burner 76, and air will be drawn in through supply pipe 71 on account of the lower pressure existing within the generator. The gas and combustion air will be ignited within combustion chamber 77 and through the surrounding walls will heat the water in the several reservoirs. As the bodies of water in receptacles 64 and 65 are heated, the water will expand thus causing an overflow in contact with the rising products of combustion. These products of combustion pass out through the openings 80 and 81 and contact directly with the exposed surface of the water in the several containers and also with the water dropping from the pan 65 and with the thin films of water flowing down the outer surfaces of the containers 65 and 64. The heating medium consisting of the mixed steam and products of combustion passes out through supply pipe 1 to the radiating system. As the pressure is further lowered within generator A', the valve D will be further opened to admit a greater quantity of fuel gas and a proportionately greater flow of combustion air will be drawn through pipe 71 into the generator. This provides more rapid combustion and a larger flame 78 and consequently increases the rate of steam generation. When the pressure within generator A' rises to atmospheric, valve D will be closed to cut off the supply of gas and no more combustion air will be drawn in through inlet pipe 71. The generator will therefore practically cease to function, although a small pilot flame will be maintained as hereinabove described. It will be noted that the pilot flame is substantially surrounded by the bodies of water always present in the generator so that a large portion of the heat from this pilot flame will be absorbed by the water. This minimizes the heat loss and the pre-heated water in the generator expedites the re-starting of the normal generating process.

It will be noted that in both of the examples herein disclosed the combustion chamber is practically surrounded by bodies of water so that the water will be rapidly heated, and the gases of combustion subsequently passed in intimate contact with the surfaces of these bodies of water and also with water overflowing to the combustion gases so that an adequate volume of steam will be generated and heat losses will be minimized. The condensate from this heating medium is returned to the body of water positioned at the greatest elevation, and since the total water in the system is continually being supplemented by the water formed in the process of combustion, no additional water will ordinarily be required after the generator receptacles are first filled. Only such water as is in excess of the requirements will be drained from the system. In this way the system is always ready to start without the necessity of replenishing the water supply. The generator is completely closed except for the inlets for the several fluids used in the generating process, and since a subatmospheric pressure is normally maintained in the generator, the entrance of these fluids will be facilitated, and the escape of combustion gases from the generator will be prevented, except through the supply main 1.

We claim:

1. The method of supplying a mixed fluid heating medium consisting of products of combustion and steam, consisting in burning fuel within a closed combustion space substantially surrounded by a body of water, the water overflowing within the space in contact with the rising products of combustion, withdrawing the mixed heating medium from the closed space, and returning condensate from the withdrawn heating medium to the body of water.

2. The method of supplying a mixed fluid heating medium consisting of products of combustion and steam, consisting in burning fuel within a closed combustion space substantially surrounded by a body of water, the water overflowing within the space through the products of combustion into a second body of water supported in the upper portion of the combustion space, withdrawing the mixed heating medium from the closed space, and returning condensate from the withdrawn heating medium to the first-mentioned body of water.

3. The method of supplying a mixed fluid heating medium consisting of products of combustion and steam, consisting in burning fuel within a closed combustion space, supporting an exposed body of water within the upper portion of the space so that it will expand when heated and overflow through the rising products of combustion, withdrawing the mixed heating medium from the closed space, and returning the condensate from the withdrawn heating medium to the body of water.

4. The method of supplying a heating medium consisting in causing products of combustion to flow upwardly through a space surrounded by a body of water retained with capacity to overflow into the space so that the overflow will be vaporized by and mixed with the products of combustion to form a heating medium, withdrawing this heating medium from the space and returning the condensate from the heating medium to said body of water.

5. In a heating system, a generator for a mixed fluid heating medium consisting of products of combustion and steam, comprising a closed housing containing a combustion chamber, a burner for introducing fuel and air to the combustion chamber, an annular container within the housing partially surrounding the combustion chamber and supporting a body of water in surface contact with the combustion gases, a container for supporting a second body of water within the housing in the path of the rising products of combustion, the water overflowing through the combustion gases from one container to another, means for supplying water to the container positioned at the greatest elevation, and an outlet for the heating medium leading from the upper portion of the housing.

6. In a heating system, a generator for a mixed fluid heating medium consisting of products of combustion and steam, comprising a closed housing consisting of a lower chamber and an upper mixing chamber, a separating wall between the chambers, a refractory combustion chamber mounted in this wall, an air inlet to the lower chamber, a burner in the lower chamber for directing fuel and air into the combustion chamber, the combustion chamber being in open communication at its upper end with the mixing chamber, an open container for a body of water within the mixing chamber, means for supplying water to the container and an outlet for the heating medium leading from the upper portion of the housing.

7. In a heating system, a generator for a mixed fluid heating medium comprising a closed housing containing a combustion chamber in its lower portion and a mixing chamber thereabove and in open communication with the combustion chamber, an annular water container surrounding the combustion and mixing chambers, and open at its upper end to overflow into the mixing chamber, an outlet for heating medium leading from the upper portion of the housing, an inlet for returning water to the container, a burner for introducing combustion materials to the combustion chamber, and an open heating pan supported within the mixing chamber, and a flash-pan below the heating pan, the water overflowing from the container through the rising products of combustion onto the heating pan and thence onto the flash-pan.

8. In a heating system, a generator for a mixed fluid heating medium comprising a closed housing containing a combustion chamber in its lower portion and a mixing chamber thereabove and in open communication with the combustion chamber, an annular water container surrounding the combustion and mixing chambers and open at its upper end to overflow into the mixing chamber, an open heating pan in the upper central portion of the mixing chamber into which the water overflows from the container, said pan being formed with a circumferential series of restricted outlet openings in its side walls adjacent the upper edge thereof, a flash-pan below the heating pan and in the path of the rising products of combustion, the overflow through the outlet openings of the heating pan falling through the mixing chamber onto the flash-pan, an outlet for the heating medium leading from the upper portion of the housing, an inlet for returning water to the container, and a burner for introducing combustion materials into the combustion chamber.

CLAYTON A. DUNHAM.
AUBRA R. DUNHAM.